Feb. 8, 1966 G. H. OTTAWAY ETAL 3,234,367

QUOTIENT GUESS DIVIDER

Filed Nov. 5, 1962

INVENTORS
GERALD H. OTTAWAY
LAWRENCE J. BOLAND
GERRIT A. BLAAUW
ROBERT KESLIN

BY Carl C. Kling
ATTORNEY

United States Patent Office 3,234,367

Patented Feb. 8, 1966

3,234,367

QUOTIENT GUESS DIVIDER

Gerald H. Ottaway, Hyde Park, Lawrence J. Boland and Gerrit A. Blaauw, Poughkeepsie, and Robert Keslin, Hyde Park, N.Y., assignors to International Business Machines Corporation, New York, N.Y., a corporation of New York Filed Nov. 5, 1962, Ser. No. 235,461
4 Claims. (Cl. 235—156)

This invention relates to a digital divider and more particularly to a divider which develops quotient digits by a series of educated quotient guesses, multiplies the divisor by the quotient guess and analyzes the quotient digit guess by subtracting the "divisor x quotient guess" product from the dividend remainder value to determine whether to take a better educated quotient digit guess or to register the quotient guess as the actual quotient and proceed.

During the short history of electronic computer development, division has been perhaps the most complex operation in the computer repertoire. Classic division generally involves both multiplication and subtraction, requires a quotient guess and presents a tricky overdraft situation where the guess is too high. Classic division thus is too difficult for most computers.

The most common computer division scheme is over-and-over subtraction of the divisor from the dividend remainder and development of the quotient digit by a count of the number of successful subtractions. Development of the quotient digit 7, for example, requires seven successive subtractions of the dividend from the remainder. The dividend remainder undergoes several actual decrementing operations before settling down.

Another division scheme which has been used is the development of certain divisor multiples such as divisor x4, x2 and x1, and the subtraction of these standard divisor multiplies from the dividend remainder in a standard sequence such as 4421. The dividend remainder undergoes a number of decrementing operations which for quotient digit 9 might be three $(4\ 4\ \not{2}\ 1)$; for the 7 quotient digit might be four $(4\ \bar{4}\ 2\ 1)$; and for the 2 quotient digit might be three $(\bar{4}\ \not{4}\ 2\ \bar{1})$.

Since division is such a complicated operation it is considered worth while to attempt by various means to cut down the number of division steps. Various schemes for fast development of quotient zeros and for making an initial quotient digit guess have been explained in patents such as U.S. Patent Number 3,028,086, April 3, 1962, H. M. Sierra, "Division System" (Serial Number 836,156, filed August 26, 1959) an application of C. M. Davis and John E. De Veer, "Computer" (Serial Number 152,391, filed November 15, 1961).

CHARACTERISTICS OF INVENTION

*Objects*

It is the object of the invention to perform the digital division operation in a computer by a series of educated guesses, using an initial quotient guess to develop a product "divisor x quotient guess" performing a mock subtraction of this product from the dividend remainder to determine by development of a high order carry or no carry whether the quotient guess is too big or not, and using the initial quotient guess and this carry to reference quotient guess table lookup means to provide the new educated guess quotient.

A more specific object of the invention is to utilize the educated guess technique, narrowing the quotient digit guess down through a series of quotient guess steps, performing a final quotient digit guess operation on an odd quotient digit and registering the actual quotient digit upon recognition of the final quotient digit guess.

*Features*

A feature of the invention is the combination of mechanism for development by table lookup of a pair of quotient guesses, representing the two possible guesses which may follow a previous guess, with additional mechanism responsive to a high order carry developing during the analysis of the previous quotient guess to select as the educated new quotient guess the high quotient digit of the pair in response to the carry or the low quotient digit of the pair in response to the no carry.

A second feature of the invention is actual quotient identification mechanism responsive to the units order bit of the high quotient guess and the complement of the units order bit of the low quotient guess to recognize the situation where the final quotient guess operation is in progress and thus control registration of the actual quotient digit as it develops.

*Advantages*

The initial quotient digit guess and each following educated guess divides by two the number of possible actual quotient digits. The actual quotient digit is thus developed according to the most economical format in so far as number of guesses is concerned. Since each guess is checked without altering the actual dividend remainder, the amount of time spent is minimized.

The quotient digit registration control mechanism which causes registration of the actual quotient digit at the end of the trial of the final quotient digit guess allows the use of an initial quotient development unit to start the quotient digit guessing at an intermediate stage of the standard sequence. This eliminates the need for a fixed number of steps in the sequence or for complicated logic to keep track of the position in the sequence.

The foregoing and other objects, features and advantages of the invention will be apparent from the following more particular description of a preferred embodiment of the invention as illustrated in the accompanying drawing.

*Figures*

SUMMARY

Figure 1:
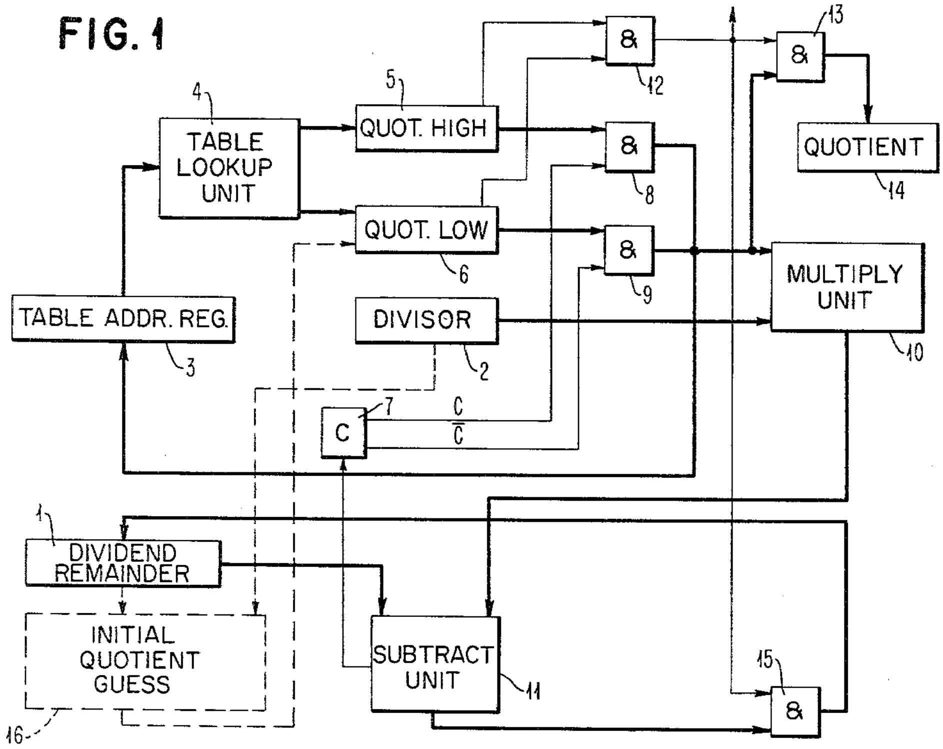
FIGURE 1 is a semischematic block diagram of the invention.

The invention divides a dividend number value stored in dividend remainder register 1 by a divisor number value stored in divisor register 2. The initial all zero setting of table address register 3 references table lookup mechanism 4 to provide a pair of quotient digit guesses to quotient high register 5 and quotient low register 6. Carry trigger 7 provides signals carry and no-carry. AND blocks 8 and 9 respond respectively to carry and no-carry signals to provide multiply unit 10 with the quotient guess content of quotient high register 5 and quotient low register 6, respectively. Multiply unit 10 responds to the quotient guess and the divisor, provided by divisor register 2, to develop the product "divisor x quotient guess." Subtract unit 11 receives this product and the content of dividend remainder register 1 and performs a subtract operation, resulting for the early guesses only in a carry value; the subtraction is a mock subtraction unless the result is gated back to dividend remainder register 1, which occurs only when the actual quotient digit has been developed and approved. The high order carry, signifying that the "divisor x quotient guess" result is equal to or less than the dividend remainder, flows to carry trigger 7. The old quotient guess, which is applied to multiply unit 10, also passes via a feedback path to table address register 3 to reference table lookup unit 4 and develop the next pair of quotient guesses in registers 5 and 6. The carry value selects the proper of the two presented quotient guesses for presentation to multiply unit 10. This procedure continues, on each cycle choosing a better educated quotient guess, until actual quotient AND circuit 12 recognizes that the quotient high register 5 content is even and the quotient low register 6 content is odd. This even-odd relationship occurs only on final quotient guess steps. AND circuit 12 gates the actual quotient via AND circuit 13 to quotient register 14 when the developing carry makes its final selection. AND circuit 15 gates the results of the subtraction to make the proper alteration in the dividend remainder content of register 1. This recognition of the actual quotient by even-odd selection characteristics makes it advantageous to start the quotient guessing at an intermediate point as dictated by an initial quotient guess mechanism 16.

DIVIDER—FIGURES 1–3

*Table lookup*

The quotient digit guessing is accomplished by references to table lookup mechanism 4, using the old quotient guess from table address register 3 to provide two possible quotient guesses and using the carry value from the previous mock subtraction to select the next quotient guess. The table is as follows:

QUOTIENT GUESS TABLE

Figure 2:
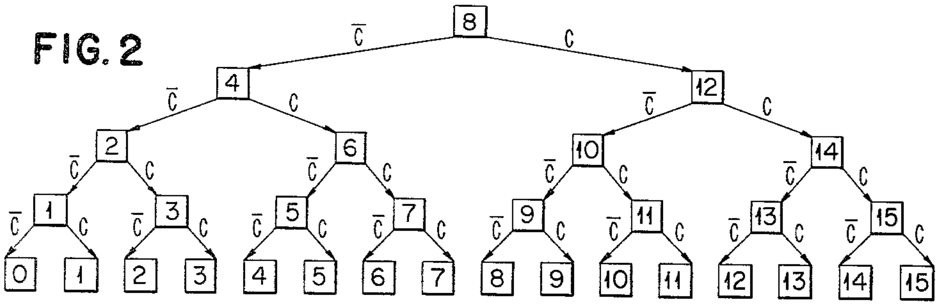
FIGURE 2 is a flow chart of hexidecimal (radix 16) division.

[Hexidecimal—See Fig. 2]

| Old quotient digit | Low guess | High guess |
|---|---|---|
| 0 0000 | 8 1000 | ---------- |
| 1 0001 | 0 0000 | 1 0001 |
| 2 0010 | 1 0001 | 3 0011 |
| 3 0011 | 2 0010 | 3 0011 |
| 4 0100 | 2 0010 | 6 0110 |
| 5 0101 | 4 0100 | 5 0101 |
| 6 0110 | 5 0101 | 7 0111 |
| 7 0111 | 6 0110 | 7 0111 |
| 8 1000 | 4 0100 | 12 1100 |
| 9 1001 | 8 1000 | 9 1001 |
| 10 1010 | 9 1001 | 11 1011 |
| 11 1011 | 10 1010 | 11 1011 |
| 12 1100 | 10 1010 | 14 1110 |
| 13 1101 | 12 1100 | 13 1101 |
| 14 1110 | 13 1101 | 15 1111 |
| 15 1111 | 14 1110 | 15 1111 |

QUOTIENT GUESS TABLE

Figure 3:
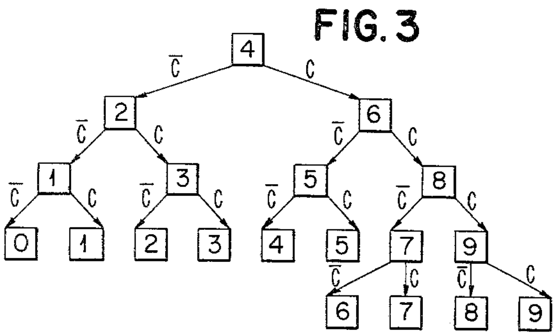
FIGURE 3 is a flow chart of decimal (radix 10) division.

[Decimal—See Fig. 3]

| Old quotient digit | Low guess | High guess |
|---|---|---|
| 0 0000 | 4 0100 | ---------- |
| 1 0001 | 0 0000 | 1 0001 |
| 2 0010 | 1 0001 | 3 0011 |
| 3 0011 | 2 0010 | 3 0011 |
| 4 0100 | 2 0010 | 6 0110 |
| 5 0101 | 4 0100 | 5 0101 |
| 6 0110 | 5 0101 | 8 1000 |
| 7 0111 | 6 0110 | 7 0111 |
| 8 1000 | 7 0111 | 9 1001 |
| 9 1001 | 8 1000 | 9 1001 |

The table is inherent in FIGURES 2 and 3. Each quotient guess (except the final quotient guess) can be followed in the normal sequence of events by one of two possible quotient guesses, as shown by the twin branches downward from each quotient guess indication. The final selection of branch is by the carry or no-carry condition C or $\overline{C}$.

In the preferred embodiment, an old quotient guess value (initially zero) in table address register 3 references a pair of possible quotient guesses which pass to quotient high register 5 and quotient low register 6 for temporary access storage. Selection between these possible quotient values is by the value of carry trigger 7 which reflects the result of the analysis of the previous quotient guess. AND circuits 8 and 9 perform the actual selection between the two possible quotient guesses and gate the selected guess forward for analysis.

More sophisticated table lookup procedures might be used, using the analysis value of the carry trigger as a table referencing parameter, thus dispensing with items 5, 6, 8 and 9, at the minimum expense of providing a larger table. The quotient high and quotient low registers 5 and 6, however, perform in the identification of the actual quotient, as will be shown infra.

*Analysis*

The selected quotient guess is applied to multiply unit 10 along with the divisor value from divisor register 2, resulting in a product "divisor x quotient guess." This product is applied along with the dividend remainder value from register 1 to subtract unit 11, which performs a mock subtraction operation to analyze the quotient guess. This mock subtraction results in a high order carry value which reflects the size relationship between the dividend remainder and the product "divisor x quotient guess." The analysis value (carry value) is stored in carry trigger 7.

A more sophisticated analysis might be carried out which could eliminate quotient guess steps. Of particular value might be the recognition of the situation (dividend remainder equals product "divisor x quotient guess") which could be used to identify the actual quotient digit directly when appropriate. The ready availability of the high order carry from the adder normally present in the computer, and the lack of availability of the equals recognition feature in such an adder, however, make it ordinarily an economical choice to analyze simply in terms of carry and no-carry to identify the relationships "less than" and "equal to or greater than." There is in any case a need for a direct relationship between the complexity of the analysis and the number of possible quotient guesses to be presented by the table lookup mechanism for selection.

The multiply unit and the subtract unit may be of various types and may even be somewhat merged, according to the makeup of the computer in which divide according to this invention is to be incorporated. The basic rule is that there is to be as little equipment added or altered as possible; any computer including division is also likely to include multiplication and subtraction.

The multiply unit might be a permanently wired matrix or read-only memory, should the divisor be limited in size. More effective in the general case is a digital multiply unit of the type described in Richards, Arithmetic Operations in Digital Computers, Van Nostrand (1955), chapter 5, pages 136–176, especially pages 155–160 (hexidecimal), chapter 9, pages 247–285, especially pages 266–267 (decimal).

The subtract unit might most advantageously be a standard parallel adder suitably controlled for subtraction and equipped with a carry lookahead feature. The lookahead carry can thus be utilized during mock subtractions as the analysis signal without any provision for carry ripple time or for the time needed to develop the subtraction result. An effective subtractor for the general case is the type described by Richards in chapter 4, pages 81–135, especially pages 113–127.

*Initial quotient guess*

The initial quotient guess can be developed by table lookup from the zero or reset value of table address register 3, in which case the quotient guessing starts at the median value of the quotient possibilities. For the general case the most effective starting point is midway of the radix, 8 for hexidecimal or 4 for decimal. In particular cases, where it is to be expected that most quotient digits in a BCD operation are to be in the range 7–9, it might be more advantageous to start at some other value such as 6. This flexibility is inherent in the table which may be set to different values in such extreme cases.

Another effective method for reducing the number of steps in the divide operation is the incorporation in the system of an initial quotient guess feature such as that included in previously cited Sierra Patent 3,028,086. A table lookup or modified table lookup approach to provide the initial quotient guess can eliminate as many as half the necessary guess steps.

Initial quotient guesses, derived by table lookup from the positions of the divisor and dividend, might provide initial guesses according to the following chart:

HEXIDECIMAL INITIAL QUOTIENT GUESS

| Divisor portion | Dividend remainder portion | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | | | | | | | | | | | | | | | | |
| 1 | 8 | 12 | | | | | | | | | | | | | | |
| 2 | 4 | 8 | 12 | | | | | | | | | | | | | |
| 3 | 4 | 8 | 12 | 14 | | | | | | | | | | | | |
| 4 | 2 | 4 | 8 | 12 | 14 | | | | | | | | | | | |
| 5 | 2 | 4 | 8 | 12 | 12 | 14 | | | | | | | | | | |
| 6 | 2 | 4 | 6 | 8 | 12 | 12 | 14 | | | | | | | | | |
| 7 | 2 | 4 | 6 | 8 | 10 | 12 | 14 | 15 | | | | | | | | |
| 8 | 1 | 2 | 4 | 6 | 8 | 10 | 12 | 14 | 15 | | | | | | | |
| 9 | 1 | 2 | 4 | 6 | 8 | 10 | 12 | 12 | 14 | 15 | | | | | | |
| 10 | 1 | 2 | 4 | 6 | 6 | 8 | 10 | 12 | 12 | 14 | 15 | | | | | |
| 11 | 1 | 2 | 4 | 5 | 6 | 8 | 10 | 10 | 12 | 14 | 14 | 15 | | | | |
| 12 | 1 | 2 | 3 | 4 | 6 | 7 | 8 | 10 | 10 | 12 | 14 | 14 | 15 | | | |
| 13 | 1 | 2 | 3 | 4 | 6 | 6 | 8 | 9 | 10 | 12 | 12 | 14 | 14 | 15 | | |
| 14 | 1 | 2 | 3 | 4 | 5 | 6 | 7 | 8 | 10 | 10 | 12 | 12 | 14 | 14 | 15 | |
| 15 | 1 | 2 | 3 | 4 | 5 | 6 | 7 | 8 | 9 | 10 | 11 | 12 | 13 | 14 | 15 | 15 |

A similar quotient guess table can be made available for decimal operation. If the dividend portion, for example, is 6xx, and the divisor portion is 7x, this encompasses the range 600–699 divided by 70–79. Quotient range is from 600/79=7+ to 699/70=9+. This range can be handled by initial quotient guess 8 in a maximum of two steps.

*Actual quotient identification*

The quotient guess table contained in table lookup unit 4 provides for each old quotient guess a pair of possible new quotient guesses, a high guess and a low guess. Choice of high or low guess is by carry value control of gating.

The new quotient guess pairs at each quotient guess step level have a characteristic odd-even relationship. This relationship is "even-odd" *only* for the final quotient guess (in the quotient guess table supra—better seen in FIGS. 2 and 3). For example, in FIG. 2, the quotient guess pairs 4 and 12 accessed by the value 8 are each even numbers and therefore have a binary 0 in the lowest order binary position. The next access, whether based on number 4 or 12, access even numbered quotient guess pairs also having binary 0 in the lowest order binary position. Numbers 2, 6, 10, or 14, access quotient guess pairs which are odd numbers and therefore will have a binary 1 in the lowest binary position. However, on the last access of a quotient guess pair, the two digits obtained will be an even number and an odd number, such as 2 and 3, or 6 and 7, etc. In this instance, the lowest order binary position of the binary coded number will have a binary 0 for one of the numbers and a binary 1 for the other of the numbers. This condition can be detected to indicate the final step in the quotient determination.

This even-odd relationship is detected by actual quotient identification AND circuit 12 which receives as inputs the low order bit from quotient high register 5 and the complement of the low order bit from quotient low register 6. Coincidence of these two inputs occurs only during the final quotient guess step. The output of AND circuit 12 conditions quotient registration control AND circuit 13 which gates the selected quotient guess from either quotient high register 5 or quotient low register 6 to quotient register 14. The output of AND circuit 12 also conditions dividend remainder updating control AND circuit 15 to pass the new remainder on to replace the old value in dividend remainder register 1.

The output of actual quotient identification AND circuit 12 also signals to the main computer controls to proceed.

*Timing*

No specific timing relationships are required, so long as no critical race situations are allowed to develop. There are two basic portions of the cycle, each of which may take an amount of time determined by the characteristics of the functional units used.

The first period is the table lookup portion of the cycle—it is imperative that the content of table address register 3 and carry trigger 7 remain static during their respective critical periods of table reference and gating.

The second period is the analysis portion of the cycle, which takes sufficient time to develop the product "divisor x quotient guess" and to subtract this product from the dividend remainder, or at least to develop the carry. Since both multiplication and subtraction are themselves major operations, this portion of the cycle may require several basic computer clock cycles.

Suitable latching techniques will allow considerable overlap of an early quotient guess analysis period with the table lookup period of the next quotient guess.

FINAL SUMMARY

The divider according to the invention performs by a standard sequence of quotient guesses an elimination process which arrives at the actual quotient by making a series of quotient guesses each predicated upon a previous quotient guess and the results of its analysis.

A table lookup operation based upon the old quotient guess provides a limited choice of possible new quotient guesses; the carry signal representative of the analysis of the old quotient guess narrows further the possible new quotient guesses, selecting a single new quotient guess.

Analysis mechanism multiplies the new quotient guess by the divisor and subtracts this product from the dividend remainder in a mock subtraction resulting only in a high order carry value. If the quotient guess is too big there is no carry; otherwise a carry results.

Actual quotient identification mechanism reacts to the special relationship between the two quotient guesses provided only on the final guess of the standard sequence to register the actual quotient, update the remainder and signal the main program control of the computer to proceed.

While the invention has been particularly shown and described with reference to a preferred embodiment, it will be understood by those skilled in the art that the foregoing and other changes in form and detail may be made without departing from the spirit and scope of the invention.

What is claimed is:

1. A divider, for operating by a series of educated quotient digit guesses, each guess eliminating substantially half the possible quotient digits, having a dividend remainder register, a divisor register and a muliply unit connected to divisor register and capable of providing product "divisor x quotient guess" for each of the possible quotient digits encompassed in the chosen radix, and a subtract unit connected to dividend register and multiplier unit for subtracting the product "divisor x quotient guess" from the dividend remainder to indicate the relative magnitude of the two numbers in response to the presence or absence of a carry from the highest order position of the subtract unit characterized by:

(a) table address register having capacity for a quotient digit;

(b) table lookup mechanism having table entry points, each containing a pair of quotient guess digits, coupled to said table address register and responsive to the quotient digit content to provide for such quotient digit the two possible quotient guess digits following in the sequence;

(c) quotient guess storage means coupled to said table lookup mechanism to receive the two possible quotient guesses;

(d) gating means responsive to a carry signal from the subtract unit for selecting the appropriate one of the two quotient guesses in said quotient guess storage means and for applying such selected quotient guess to said table address register and to multiply unit whereby the product "divisor x quotient guess" is subtracted by subtract unit from the dividend remainder content of dividend remainder register.

2. A divider according to claim 1, comprising, in addition:

(e) final quotient recognition mechanism coupled to said quotient guess storage means (c) and responsive to the low order bits of the two possible quotient digits to recognize the final guess situation said final guess situation being recognizable when one of the two possible final quotient digits has an even numerical value and the other an odd numerical value;

(f) final quotient registration means coupled to said final quotient recognition means (e) to register the quotient; and (g) dividend remainder updating means coupled to said final quotient recognition means (e) and to the subtract means to gate the result of subtracting the product of multiplying the divisor and the finally selected quotient digit from the dividend remainder back to said dividend remainder register.

3. A divider, for operating by a series of educated quotient digit guesses, each guess eliminating substantially half the possible quotient digits, having a dividend-remainder register, divisor register, quotient register, and multiply unit adapted to produce a product value equal to the divisor times a quotient digit, comprising in combination therewith:

table look-up mechanism including a table of quotient digit pairs having an input responsive to single quotient digits and providing an output representing two probable quotient digits in the series of educated quotient digit guesses;

table address means coupled to the input of said table look-up mechanism for retaining a quotient digit;

quotient digit storage means coupled to said table look-up mechanism to receive the two probable quotient digits;

magnitude indicating means coupled to said multiply unit and dividend-remainder register for indicating the relative magnitude of the product and dividend-remainer;

and gating means connected to said magnitude indicating means and to said quotient digit storage means, for transferring one of said two probable quotient digits to said multiply unit and said table address means.

4. A divider in accordance with claim 3 including:

final quotient recognition means coupled to said quotient digit storage means operative when one of said quotient digit pairs has an even numerical value and the other an odd numerical value for producing an output indicating the final quotient guess situation;

means coupled to said quotient register, responsive to said final guess situation output and said gating means to register the final quotient digit;

and means coupled to said multiply unit and said dividend-remainder register, responsive to said final quotient guess output, for reducing the dividend-remainder in said dividend-remainder register by an amount equal to the product of divisor times final quotient digit.

References Cited by the Examiner

UNITED STATES PATENTS

| | | | |
|---|---|---|---|
| 2,544,126 | 3/1951 | Baldwin | 235—156 |
| 2,936,116 | 5/1960 | Adamson et al. | 235—165 |
| 3,028,086 | 4/1962 | Sierra | 235—160 |

OTHER REFERENCES

Pages 67–91, January 1961, Mac Sorley "High Speed Arithmetic in Binary Computers," Proceedings of the IRE, vol. 49, No. 1.

ROBERT C. BAILEY, *Primary Examiner.*

MALCOLM A. MORRISON, *Examiner.*